United States Patent [19]

Faulstich et al.

[11] 3,999,996
[45] Dec. 28, 1976

[54] COMPATIBLE NEAR-PORTION PHOTOTROPIC GLASS

[75] Inventors: Marga Faulstich, Mainz; Georg Gliemeroth, Finthen, both of Germany

[73] Assignee: Jenaer Glaswerk Schott & Gen., Mainz, Germany

[22] Filed: Apr. 27, 1976

[21] Appl. No.: 680,750

Related U.S. Application Data

[63] Continuation-in-part of Ser. No. 675,449, April 9, 1976, and a continuation-in-part of Ser. No. 359,624, May 14, 1973, abandoned.

[30] Foreign Application Priority Data

May 15, 1972 Germany .......................... 2223629

[52] U.S. Cl. .................. 106/53; 106/47 Q
[51] Int. Cl.$^2$ .................. C03C 3/08; C03C 3/10
[58] Field of Search ............ 156/DIG. 6, 53, 47 Q; 428/428

[56] References Cited

UNITED STATES PATENTS

| | | | |
|---|---|---|---|
| 3,653,933 | 4/1972 | Tsunekawa | 106/47 Q |
| 3,765,913 | 10/1973 | Murahaim et al. | 106/DIG. 6 |
| 3,801,336 | 4/1974 | Upton | 106/47 Q |
| 3,915,723 | 10/1975 | Upton | 106/53 |

*Primary Examiner* — Winston A. Douglas
*Assistant Examiner* — Mark Bell
*Attorney, Agent, or Firm* — Millen, Raptes & White

[57] ABSTRACT

Glass as near-portion material for fusion with known phototropic far-portion glasses for multifocal spectacle lenses has a linear thermal expansion coefficient between 45 and 58 × 10$^{-7}$/° C, a refractive index of $n_d \geq 1.60$, a speed of crystallization of less than 0.5 $\mu$/min., and the following composition:

| | |
|---|---|
| $SiO_2$ | 10.0 – 20.0 % by weight |
| $B_2O_3$ | 15.0 – 23.0 % by weight |
| PbO | >26.0 – 30.0 % by weight |
| ZnO | 3.0 – 5.0 % by weight |
| $La_2O_3$ | 6.0 – 10.0 % by weight |
| $Al_2O_3$ | 12.0 – 17.0 % by weight |
| $ZrO_2$ | 0.5 – 3.0 % by weight |
| $TiO_2$ | 0.2 – 3.0 % by weight |
| $K_2O$ | 0.1 – 2.0 % by weight |
| $Na_2O$ | 0.1 – 2.0 % by weight |
| $Li_2O$ | 0.1 – 4.0 % by weight | with the provision that:

| | |
|---|---|
| sum of $SiO_2 + B_2O_3$ is | 30.0 – 40.0 % by weight |
| sum of the alkali oxides is | 0.2 – 3.0 % by weight |
| sum of $Al_2O_3 + La_2O_3$ is | 19.0 – 27.0 % by weight |
| sum of the alkaline earth oxides is | 3.0 – 8.0 % by weight, MgO being less than 5 % by weight and BaO being 3 – 8 % by weight |
| sum of $ZnO + ZrO_2 + TiO_2$ is | 3.0 – 6.0 % by weight |
| sum of the oxides of Bi, Ta, Nb, W is | 0 – 5.0 % by weight. |

10 Claims, No Drawings

COMPATIBLE NEAR-PORTION PHOTOTROPIC GLASS

CROSS REFERENCE TO RELATED APPLICATION

This application is a continuation-in-part of continuing application, Ser. No. 675,449, filed Apr. 9, 1976, for "Phototropic Glass for Multifocal Spectacle-Glasses" of a parent application of the same title, Ser. No. 359,624, filed May 14, 1973, now abandoned, the latter application being incorporated by reference herein.

BACKGROUND OF THE INVENTION

The invention relates to glasses having a refractive index of $\gtrless 1.60$ and a linear thermal expansion coefficient of $45 - 58 \times 10^{-7}/°C$, and especially to such glasses which can be fused with the known phototropic borosilicate glasses to form multifocal spectacle lenses wherein the near-portion glass is preferably also phototropic.

Phototropic borosilicate glasses are described in German Offenlegungsschrifts Nos. 1,924,493 and 2,223,629, the former relating to glasses with refractive indices nd $\leq 1.53$.

German Offenlegungsschrift No. 2,223,629 (corresponding to U.S. parent application Ser. No. 359,624) describes phototropic glasses which are suitable as the near-portion for fusion with phototropic far-portion glasses for multifocal spectacle lenses, and which have a linear thermal expansion coefficient between 45 and 58 × $10^{-7}/°$ C and a refractive index $nd$ higher than 1.60. These glasses are characterized by a composition range which, after synthesis, contains the following oxides in addition to phototropicity-imparting silver and halogens:

30 – 45 % by weight $SiO_2 + B_2O_3$
0 – 8 % by weight alkali oxides
24 – 54 % by weight $Al_2O_3 + La_2O_3$
0 – 25 % by weight $ZnO + ZrO_2 + TiO_2$ and also advantageously 2 – 25 % by weight $ZnO + ZrO_2 + TiO_2$
6 – 26 % by weight PbO
0 – 8 % by weight alkaline earth oxide.

One particularly suitable composition range for these phototropic near-portion glasses is, in percent by weight:

| | | |
|---|---|---|
| $SiO_2$ | 5 – 30 | % by weight |
| $B_2O_3$ | 7 – 35 | % by weight |
| PbO | 6 – 26 | % by weight |
| ZnO | 0 – 15 | % by weight |
| $La_2O_3$ | 12 – 30 | % by weight |
| $Al_2O_3$ | 12 – 25 | % by weight |
| $ZrO_2$ | 0 – 6 | % by weight |
| $TiO_2$ | 0 – 3 | % by weight |
| $K_2O$ | 0 – 2 | % by weight |
| $Na_2O$ | 0 – 2 | % by weight |
| $Li_2O$ | 0 – 4 | % by weight |
| $Ag_2O$ | 0.1 – 1.8 | % by weight |
| CuO | 0 – 0.05 | % by weight |
| CoO | 0 – 0.01 | % by weight | and the following anion proportions in grams:

| | |
|---|---|
| Cl | 0.2 – 4.5 |
| Br + I | 0 – 4.0 |
| F | 0 – 4.0 | replacing the oxygen in grams, based on 100 g of glass oxide, with the following composition conditions being maintained:

| | | |
|---|---|---|
| sum of alkali oxides | 0.2 – 8 | |
| sum of $Al_2O_3 + La_2O_3$ | 24.0 – 54 | |
| sum of alkaline earth oxides | 0 – 8, | in which MgO is less than 5.0 |
| sum of $ZnO + ZrO_2 + TiO_2$ | 2 – 25 | |
| sum of the oxides of Bi, Ta, Nb, W | 0 – 5. | |

Using these near-portion glass materials, it is possible by conventional melting methods to produce glasses which provide good multifocal lenses after having been fused with phototropic far-portion glasses.

Owing to their high content of lanthanum oxide, in combination with boron oxide, aluminum oxide, lead oxide, zirconium dioxide and titanium dioxide, the glasses according to Offenlegungsschrift 2,223,629 have, unfortunately, a tendency to crystallization, and in light of the temperature-viscosity properties of the glass, substantial difficulties are encountered in the continuous production of such bulk glasses in tanks.

SUMMARY OF THE INVENTION

A principal object of this invention is to modify the crystallization behavior of near-portion glasses having a refractive index nd higher than 1.60 and a linear thermal expansion coefficient between 45 and 58 × $10^{-7}/°$ C so that the rate of crystallization growth, determined by tempering for 60 minutes in the gradient furnace, is improved below a limit of $\gtrless 0.5$ $\mu$m/min. and does not occur in the range of the fusion viscosity.

Upon further study of the specification and appended claims, further objects and advantages of this invention will become apparent to those skilled in the art.

To attain these objects, it has now been unexpectedly found that the advantages which can be achieved by the addition of 12 to 30% by weight of lanthanum oxide in accordance with Offenlegungsschrift No. 2,223,629 are retained if the content of lead oxide in the near-portion material is slightly increased to over 26.0% by weight. It is then possible for the lanthanum oxide content to be reduced within certain limits, so that the crystallization behavior of this special composition range is considerably improved. It has now been found that, wth respect to the limits of the Offenlegungsschrift No. 2,223,629, by an increase in the lead oxide content up to a top limit of 30% by weight and by a decrease in the lanthanum oxide content down to a bottom limit of 7% by weight, it is possible to achieve the required improvement in the speed of crystallization so that the rate of crystallization growth is reduced to $\gtrless 0.5$ $\mu$m/min. It was also found, however, that the sum of $Al_2O_3$ and $La_2O_3$ must not fall below 19% by weight, despite the said lowering of the bottom limit of the $La_2O_3$.

DETAILED DISCUSSION

The rate of crytallization growth is established by microscopically determining the variation in length per unit of time of the growing crystals. With the assistance of a temperature gradient furnace, the crystallization behavior is measured as a function of time and temperature. It is possible in this way to establish the upper crystallization limit, the lower crystallization limit, the maximum of the crystallization and also the rate of crystallization growth at this crystallization maximum. Thus, throughout the specification and claims, the data relate to the rate of growth of the crystals at the maximum of crystallization. For example, 0.7 μm/min. Crystal growth means that in a certain temperature range crystals are growing linearily with a rate of 0.7 μm/min. This temperature range covers the whole region between liquid glass (<$10^3$ poise) and solid glass (>$10^{14}$ poise).

In the same way as the glasses described in the parent application, the near-portion materials of this application can be made phototropic by the addition of silver and halogens. The phototropicity of these glasses varies within wide limits, and can be adapted to the phototropicity of the far-portion materials. In general, the contents of silver and halogens used in the near-portion phototropic glass, are:

| | |
|---|---|
| $Ag_2O$ | 0.1 – 1.8 % by weight |
| Cl | 0.2 – 4.5 % by weight |
| Br | 0 – 3.8 % by weight |
| I | 0 – 0.7 % by weight |
| F | 0 – 4.0 % by weight |

The sum of bromine and iodine is thus 0 to 4.5 parts by weight. Copper oxide is preferably added as sensitizer in a concentration between 0 and 0.05 parts by weight.

The near-portion materials are of course not phototropic absent a content of silver and halogens, but they can be used in any case as glass for the production of non-phototropic near-portion glasses and can be fused with the known phototropic far-portion glasses.

In a preferred aspect of this invention, the concentration of PbO should be at least 26.4%, especially at least 26.6% by weight, the particularly preferred ranges of PbO being 26.8 to 29.5%, especially 26.8 to 29.3% by weight.

With respect to the $La_2O_3$ content, it is preferred that it be reduced to not more than 9.8%, especially not more than 9.7% by weight, the preferred ranges being 6.5 to 9.5%, especially 6.9 to 9.0% by weight.

From the standpoint of the overall composition of the near-portion material of this invention, a near-portion glass according to this invention which can be fused with a normal commercial phototropic far-portion glass for bifocal and multifocal spectacle lenses should advantageously have the following composition range:

| | |
|---|---|
| $SiO_2$ | 10.0 – 20.0 % by weight |
| $B_2O_3$ | 15.0 – 23.0 % by weight |
| PbO | >26.0 – 30.0 % by weight |
| ZnO | 3.0 – 5.0 % by weight |
| $La_2O_3$ | 6.0 – 10.0 % by weight |
| $Al_2O_3$ | 12.0 – 17.0 % by weight |
| ZrO | 0.5 – 3.0 % by weight |
| $TiO_2$ | 0.2 – 3.0 % by weight |
| $K_2O$ | 0.1 – 2.0 % by weight |
| $Na_2O$ | 0.1 – 2.0 % by weight |
| $Li_2O$ | 0.1 – 4.0 % by weight | with the further provision that:

| | | |
|---|---|---|
| sum of $SiO_2 + B_2O_3$ is | 30.0 – 40.0 % | by weight |
| sum of the alkali oxides is | 0.2 – 3.0 % | by weight |
| sum of $Al_2O_3 + La_2O_3$ is | 19.0 – 27.0 % | by weight |
| sum of the alkaline earth oxides is | 3.0 – 8.0 % | by weight, MgO being less than 5% by wt. and BaO being 3–8% by wt. |
| sum of $ZnO + ZrO_2 + TiO_2$ is | 3.0 – 6.0 % | by weight |
| sum of the oxides of Bi, Ta, Nb, W is | 0 – 5.0 % | by weight. |

The addition of components which cause the phototropy generally is:

| | |
|---|---|
| $Ag_2O$ | 0.1 – 1.8 % by weight |
| CuO | 0 – 0.05% by weight |
| CoO | 0 – 0.01% by weight | and that of halogens which replace the oxygen in the anion proportions, is:

| | |
|---|---|
| Cl | 0.2 – 4.5 % by weight |
| Br + I | 0 – 4.0 % by weight |
| F | 0 – 4.0 % by weight. |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example, all temperatures are set forth uncorrected in degrees Celsius; unless otherwise indicated, all parts and percentages are by weight.

Shown in Table 1 are various examples of compositions which, starting from the composition 1.1, are intended to show the improvement in the crystallization properties of the glasses according to the invention. Example 1.1 is a composition within Offenlegungsschrift No. 2,223,629 (parent patent). The composition 1.2 in Table 1 is also within Offenlegungsschrift No. 2,223,629 and shows crystallization properties of a glass which was kept as close as possible to the composition limits of the said Offenlegungsschrift.

Examples 1.3 to 1.9 in Table 1 represent compositions according to the invention.

The determination of the refractive indices of the glasses according to the invention was effected by refractometry; the testing of the fusibility of a near-portion glass with the phototropic far-portion glasses was carried out by a method of measurement frequently used in the glass industry, by fusing a representative standard glass with the respective glass being tested. The photoelastic measurement gives the difference in movement in nm/cm, the limit of the fusibility being in this connection set at a difference of plus or minus 50 nm/cm.

The following is a preferred example of how to produce a near-portion glass according to the invention, using the following raw materials:

| | | | |
|---|---|---|---|
| $SiO_2$ | 18.7 % by weight | purified quartz sand | 40.09 kg |
| $B_2O_3$ | 19.8 % by weight | boron oxide | 74.56 kg |
| $K_2O$ | 0.3 % by weight | potash | 0.93 kg |
| BaO | 5.6 % by weight | barium carbonate | 15.39 kg |
| ZnO | 4.0 % by weight | zinc oxide | 8.69 kg |
| PbO | 28.1 % by weight | red lead | 60.27 kg |
| $Al_2O_3$ | 13.2 % by weight | aluminum trihydrate | 38.20 kg |
| $La_2O_3$ | 7.6 % by weight | lanthanum oxide | 14.96 kg |
| $TiO_2$ | 1.5 % by weight | titanium dioxide | 3.18 kg |
| $ZrO_2$ | 0.6 % by weight | zirconium dioxide | 1.69 kg |
| $Ta_2O_5$ | 0.3 % by weight | tantalum oxide | 0.63 kg |
| $As_2O_3$ | 0.3 % by weight | arsenic | 0.63 kg |

This batch is introduced, thoroughly mixed, at 141° C into a platinum crucible which holds 90 liters and melted. After the batch has been thoroughly melted, it is homogenized for 5 hours by stirring at 40 r.p.m. and at 1400° C. The glass is then released in portions weighing 5 kg through an emptying lock chamber arranged on the bottom of the crucible. Each portion is poured into a steel mold at 1315° C and cooled from 520° C to room temperature at 15° C/hour. In this way, billets of the near-portion glass are obtained, and after these have been sawed, ground and polished, they can be processed to form near-portions.

The near-portions have a refractive index of 1.6501 (nd), and can be fused with phototropic far-portion glasses by conventional production methods. After being fused with the far-portion glass, a fusion tension of + 30 nm/cm is obtained.

Because of the very low rate of crystallization of $\leq$ 0.50 $\mu$/min. in the crystallization maximum, the same mixture can, moreover, be introduced batch-wise over a prolonged period of time into a conventional opthalmic melting tank. In these conventional melting tanks, after homogenization, the glass is processed as follows:

The stream of homogenized glass is conducted into a platinum tube having a diameter of 20 mm and a length of 2.4 m and is cooled therein to a temperature which corresponds to a viscosity of $7 \times 10^3$ poises. The length of glass is passed continuously out of the platinum tube at this viscosity and is cut to measured lengths by shears. The individual portions are then placed in molds and are pressed to the shape of near-portions. However, because of the prescribed viscosity at the time of cutting, this very economical method of production of the near-portions takes place in temperature ranges which normally are quite close to the maximum of the crystallization. Consequently, only glasses having a very small tendency to crystallization are suitable for this purpose.

The mixture or batch as indicated above can readily be processed at a cutting temperature which is only 10° C higher than the temperature maximum of the crystallization, since its speed of crystallization is extremely low. There are also produced therefrom near-portions which have a refractive index of 1.6501 and, after being fused with the normal commercial far-portions, have a fusion tension of + 30 nm/cm and consequently are particularly suitable for the production of phototropic multifocal lenses. These near-portion glasses were fused with phototropic far-portion glass, of which the linear coefficient of expansion is between 20° − 300° C = $49.7 \times 10^{-7}$/° C. The normal commercial phototropic far-portion glasses have a linear thermal expansion coefficient between 45 and $58 \times 10^{-7}$/° C in a temperature range between 20° and 300° C.

The coefficients of expansion of the near-portion glasses in the composition range according to the invention can be adapted to the expansion coefficient of the phototropic far-portion glass being used.

For further information on normal commercial phototropic far-portion glass which can be fused to the near-portion glass of this invention, attention is directed to the following references, incorporated herein:
U.S. Pat. No. 2,410,145 and
U.S. Patent No. 2,890,551.

Table 1

| Oxides | 1.1 | 1.2 | 1.3 | 1.4 | 1.5 | 1.6 | 1.7 | 1.8 |
|---|---|---|---|---|---|---|---|---|
| $SiO_2$ | 8.0 | 8.0 | 17.7 | 19.7 | 18.7 | 19.0 | 16.2 | 18.4 |
| $B_2O_3$ | 29.8 | 30.2 | 20.0 | 17.9 | 19.5 | 20.8 | 20.15 | 20.1 |
| $Al_2O_3$ | 18.3 | 17.0 | 13.3 | 12.4 | 13.1 | 13.5 | 16.7 | 13.4 |
| $La_2O_3$ | 17.5 | 15.2 | 7.3 | 7.0 | 6.9 | 7.0 | 7.0 | 9.0 |
| $ZrO_2$ | 3.6 | 0.5 | 1.6 | 1.0 | 0.8 | 1.8 | 1.5 | 0.6 |
| ZnO | 4.1 | 3.3 | 4.1 | 4.0 | 4.0 | 4.1 | 2.9 | 4.1 |
| $TiO_2$ | 0.5 | 2.5 | 1.8 | 0.5 | 1.5 | 0.4 | 1.05 | 1.8 |
| BaO | — | — | 5.9 | 7.7 | 5.5 | 4.1 | 4.85 | 4.4 |
| MgO | 0.4 | — | — | — | — | 0.3 | 0.20 | — |
| SrO | — | — | — | — | — | 0.1 | 0.07 | — |
| PbO | 15.9 | 21.6 | 26.8 | 29.3 | 27.2 | 27.9 | 28.2 | 27.7 |
| $Li_2O$ | 0.8 | — | — | — | — | 0.1 | 0.05 | — |
| $Na_2O$ | 0.2 | — | — | — | — | 0.2 | 0.25 | — |
| $K_2O$ | 0.3 | 1.15 | 0.3 | 0.2 | 0.3 | 0.3 | 0.25 | 0.2 |
| $Ta_2O_5$ | — | — | 1.0 | — | 0.3 | 0.1 | 0.05 | — |
| $Nb_2O_5$ | — | — | — | — | — | — | — | — |
| $WO_3$ | — | — | — | — | — | — | — | — |
| $Ag_2O$ | 0.17 | — | — | — | 0.19 | — | — | — |
| CuO | 0.03 | — | — | — | 0.02 | — | — | — |
| CoO | — | — | — | — | — | — | — | — |
| $As_2O_3$** | 0.40 | 0.5 | 0.3 | 0.3 | 0.3 | 0.3 | 0.3 | 0.3 |
| F** | — | — | — | — | — | — | — | — |
| Cl** | 0.50 | — | — | — | 0.6 | — | — | — |
| Br+I** | 1.20 | — | — | — | 1.1 | — | — | — |
| Σ Alkalioxides | 1.3 | 1.15 | 0.3 | 0.2 | 0.3 | 0.6 | 0.5 | 0.2 |
| Σ $Al_2O_3$+$La_2O_3$ | 35.8 | 32.2 | 20.6 | 19.4 | 20.0 | 20.5 | 23.7 | 22.4 |
| Σ Alk. earth oxides | 0.4 | 0 | 5.9 | 7.7 | 5.7 | 4.5 | 5.12 | 4.4 |
| Σ ZnO+$ZrO_2$−$TiO_2$ | 8.2 | 6.3 | 7.5 | 5.5 | 6.3 | 6.3 | 5.55 | 6.5 |
| Σ Oxides, of Bi, Ta Nb, W | — | 0 | 1.0 | 0 | 0.3 | 0.1 | 0.05 | — |
| Phys. chem. Properties | | | | | | | | |
| Refr. index nd | 1.65 | 1.657 | 1.66 | 1.6539 | 1.65 | 1.642 | 1.649 | 1.659 |
| Fusion point* | +40 | +46 | +27 | −45 | +35 | −48 | +50 | −50 |

Table 1-continued

| Oxides | 1.1 | 1.2 | 1.3 | 1.4 | 1.5 | 1.6 | 1.7 | 1.8 |
|---|---|---|---|---|---|---|---|---|
| $\mu$/cm/Standard Gtyst.Test time in Min. | 5' | 5' | 60 | 60 | 60 | 60 | 60 | 60 |
| UCL° C | 1120 | 970 | 910 | 925 | 900 | 1100 | <1115 | 890 |
| LCL° C | 800 | 750 | <725 | <775 | 800 | <850 | xxx | <70 |
| Clmax ° C | 1070 | 890 | 825 | 845 | 855 | 975 |  | 825 |
| $\mu$/min | 1.0 | 2.6 | 0.04 | 0.06 | 0.03 | 0.16 |  | 0.4 |

'Comparison with standard, see Auslegeschrift 2,223,629
''Batch calculation for the ions, see Auslegeschrift 2,223,629
'''<1115 - granulation on the surface; no definite growth size measurable The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Glass, suitable as near-portion material for fusion with phototropic far-portion glass for multifocal spectacle lenses, having a linear thermal expansion coefficient between 45 and 58 × $10^{-7}$/° C, a refractive index of $n_d \geq 1.60$, a speed of crystallization of less than 0.5 $\mu$/min. and the following composition:

| | |
|---|---|
| $SiO_2$ | 10.0 – 20.0 % by weight |
| $B_2O_3$ | 15.0 – 23.0 % by weight |
| PbO | >26.0 – 30.0 % by weight |
| ZnO | 3.0 – 5.0 % by weight |
| $La_2O_3$ | 6.0 – 10.0 % by weight |
| $Al_2O_3$ | 12.0 – 17.0 % by weight |
| $ZrO_2$ | 0.5 – 3.0 % by weight |
| $TiO_2$ | 0.2 – 3.0 % by weight |
| $K_2O$ | 0.1 – 2.0 % by weight |
| $Na_2O$ | 0.1 – 2.0 % by weight |
| $Li_2O$ | 0.1 – 4.0 % by weight | with the provision that:

| | |
|---|---|
| sum of $SiO_2 + B_2O_3$ is | 30.0 – 40.0 % by weight |
| sum of the alkali oxides is | 0.2 – 3.0 % by weight |
| sum of $Al_2O_3 + La_2O_3$ is | 19.0 – 27.0 % by weight |
| sum of the alkaline earth oxides is | 3.0 – 8.0 % by weight, MgO being less than 5 % by weight and BaO being 3 – 8 % by weight |
| sum of $ZnO + ZrO_2 + TiO_2$ is | 3.0 – 6.0 % by weight |
| sum of the oxides of Bi, Ta, Nb, W is | 0 – 5.0 % by weight. |

2. A material according to claim 1, further containing phototropicity-causing substances, as follows:

| | |
|---|---|
| $Ag_2O$ | 0.1 – 1.8 % by weight |
| CuO | 0 – 0.05% by weight |
| CoO | 0 – 0.01% by weight | and halogens, which replace the oxygen in the anion portions,

| | |
|---|---|
| Cl | 0.2 – 4.5 % by weight |
| Br + I | 0 – 4.0 % by weight |
| F | 0 – 4.0 % by weight. |

3. A glass according to claim 1 wherein the concentration of PbO is at least 26.4% by weight.

4. A glass according to claim 1 wherein the concentration of PbO is at least 26.6% by weight.

5. A glass according to claim 1 wherein the concentration of PbO is 26.8 to 29.5% by weight.

6. A glass according to claim 1 wherein the concentration of PbO is 26.8 to 29.3% by weight.

7. A glass according to claim 1 wherein the $La_2O_3$ content is not more than 9.8% by weight.

8. A glass according to claim 1 wherein the $La_2O_3$ content is not more than 9.7% by weight.

9. A glass according to claim 1 wherein the $La_2O_3$ content is 6.5 to 9.5% by weight.

10. A glass according to claim 1 wherein the $La_2O_3$ content is 6.9 to 9.0% by weight.

* * * * *